United States Patent
Ajami et al.

(10) Patent No.: US 9,937,424 B2
(45) Date of Patent: *Apr. 10, 2018

(54) COLLABORATIVE DIPLOMACY MECHANICS

(71) Applicant: Zynga Inc., San Francisco, CA (US)

(72) Inventors: Amer Ajami, Manhattan Beach, CA (US); Hans C. Yang, Hawthorne, CA (US); Michael John Goodwin, Bellflower, CA (US); Gregory Anthony Black, Playa Del Rey, CA (US)

(73) Assignee: Zynga Inc., San Francisco, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 14/337,681

(22) Filed: Jul. 22, 2014

(65) Prior Publication Data

US 2014/0335960 A1    Nov. 13, 2014

Related U.S. Application Data

(63) Continuation of application No. 13/244,825, filed on Sep. 26, 2011, now Pat. No. 8,790,182.

(Continued)

(51) Int. Cl.
| | |
|---|---|
| *A63F 13/795* | (2014.01) |
| *A63F 13/798* | (2014.01) |
| *A63F 13/58* | (2014.01) |
| *H04L 29/06* | (2006.01) |
| *A63F 13/30* | (2014.01) |

(52) U.S. Cl.
CPC ............ *A63F 13/795* (2014.09); *A63F 13/12* (2013.01); *A63F 13/58* (2014.09); *A63F 13/798* (2014.09); *H04L 67/38* (2013.01); *A63F 2300/407* (2013.01); *A63F 2300/556* (2013.01); *A63F 2300/609* (2013.01); *A63F 2300/65* (2013.01)

(58) Field of Classification Search
CPC ...... A63F 13/58; A63F 13/795; A63F 13/822; A63F 2300/556; A63F 2300/807
See application file for complete search history.

(56) References Cited

U.S. PATENT DOCUMENTS

| | | | |
|---|---|---|---|
| 7,690,997 | B2 | 4/2010 | Van Luchene et al. |
| 7,780,533 | B2 | 8/2010 | Yamauchi et al. |
| (Continued) | | | |

OTHER PUBLICATIONS

Thorbjoern, "Knightood War Mode Tutorial From HiveWiki," available at http://web.archive.org/web/20100722125211/http://wiki.hive7.com/Knighthood_War_Mode_Tutorial, last accessed, May 12, 2017.*

(Continued)

*Primary Examiner* — Jay Liddle
(74) *Attorney, Agent, or Firm* — Schwegman Lundberg & Woessner, P.A.

(57) ABSTRACT

A collaborative diplomacy mechanics system for an online game is described. A player selects an ally to be engaged in a combat mode of an online social game against an enemy. The profile of the selected ally is retrieved. An ally power up weapon is generated based on the profile of the selected ally. The ally power up weapon is applied against a combat unit of an enemy of a player in the combat mode. The ally power up weapon can also be applied on a combat unit of the player in the combat mode.

20 Claims, 12 Drawing Sheets

Related U.S. Application Data

(60) Provisional application No. 61/491,046, filed on May 27, 2011.

(56) References Cited

U.S. PATENT DOCUMENTS

| | | | |
|---|---|---|---|
| 7,955,175 | B1 | 6/2011 | Holloway et al. |
| 8,790,182 | B2 | 7/2014 | Ajami et al. |
| 2004/0266505 | A1 | 12/2004 | Keam et al. |
| 2006/0003824 | A1 | 1/2006 | Kobayashi et al. |
| 2007/0060233 | A1 | 3/2007 | Liccardo |
| 2008/0090659 | A1 | 4/2008 | Aguilar et al. |
| 2010/0173713 | A1 | 7/2010 | Van Luchene |
| 2010/0216553 | A1 | 8/2010 | Chudley et al. |
| 2010/0304806 | A1 | 12/2010 | Coleman et al. |
| 2011/0237335 | A1* | 9/2011 | Holloway ............ A63F 13/822 463/42 |
| 2011/0269551 | A1 | 11/2011 | Johnson et al. |
| 2012/0015745 | A1* | 1/2012 | Mooney ............ A63F 13/822 463/42 |
| 2012/0302352 | A1 | 11/2012 | Ajami et al. |

OTHER PUBLICATIONS

"U.S. Appl. No. 13/244,825, Examiner Interview Summary dated Feb. 8, 2012", 5 pgs.

"U.S. Appl. No. 13/244,825, Final Office Action dated May 7, 2012", 10 pgs.

"U.S. Appl. No. 13/244,825, Non Final Office Action dated Jan. 23, 2012", 8 pgs.

"U.S. Appl. No. 13/244,825, Non Final Office Action dated Nov. 5, 2013", 9 pgs.

"U.S. Appl. No. 13/244,825, Notice of Allowance dated May 15, 2014", 9 pgs.

"U.S. Appl. No. 13/244,825, Response filed Mar. 31, 2014 to Non-Final Office Action dated Nov. 5, 2013", 11 pgs.

"U.S. Appl. No. 13/244,825, Response filed Apr. 23, 2012 to Non Final Office Action dated Jan. 23, 2012", 9 pgs.

"U.S. Appl. No. 13/244,825, Response filed Aug. 7, 2012 to Final Office Action dated May 7, 2012", 11 pgs.

"Knighthood", From HiveWiki, [Online]. Retreived from the Internet:<http://web.archive.org/web/20090307224611/http://wiki.hive7.com/Knighthood>, last accessed, Jan. 11, 2012, (Accessed Jan. 11, 2012), 17 pgs.

"Knighthood Release Notes", From HiveWiki, [Online]. Retreived from the Internet: <http://web.archive.org/web/20100619010851/http://.../Knighthood_Release_Notes>, (Accessed Jan. 11, 2012), 10 pgs.

Christensen, Thorbjorn Lau, "Knighthood War Mode Tutorial", From HiveWiki, [Online]. Retreived from the Internet:<http://web.archive.org/web/20100722125211/.../Knighthood_War_Mode_Tutorial>, last accessed, Jan. 11, 2012, (Nov. 2, 2008), 19 pgs.

* cited by examiner

COLLABORATIVE DIPLOMACY MECHANICS

RELATED APPLICATIONS

The present application is a continuation of U.S. patent application Ser. No. 13/244,825, filed on Sep. 26, 2011, and issued as U.S. Pat. No. 8,790,182 on Jul. 29, 2014, which claims priority from provisional US Patent Application Ser. No. 61/491,046, filed May 27, 2011, the entire contents of which is incorporated herein by reference.

TECHNICAL FIELD

The present disclosure generally relates to games and applications and, in example embodiments, to computer-implemented, online social games.

BACKGROUND

Online social games are becoming widespread. Social games combine aspects of social networking with gaming. In an online social game, multiple players play against one another and corroborate with one another to further their respective online social game.

BRIEF DESCRIPTION OF THE DRAWINGS

The present disclosure is illustrated by way of example, and not by way of limitation, in the figures of the accompanying drawings in which.

DETAILED DESCRIPTION

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

A collaborative diplomacy mechanics system for an online game is described. A player selects an ally to be engaged in a combat mode of an online social game against an enemy. The profile of the selected ally is retrieved. An ally power up weapon is generated based on the profile of the selected ally. The ally power up weapon is applied against combat units of an enemy of a player in the combat mode or on the combat units of the player in the combat mode. The enemy may be a computer-controlled player in the online social game.

In another embodiment, a request to engage in a combat game mode is received from a player of an online social game against a computer-controlled player of the online social game. A determination is made as to whether the player is eligible to select an ally to assist the player in the combat game mode based on a game level of the player in the online social game. One or more allies are generated from which the player can select based on the game level of the player and the number of in game neighbors of the player. A super weapon from the selected ally for use in the combat game mode is generated based on a profile of the selected ally. The super weapon is applied one-time during the combat game mode.

In one embodiment, the ally power up weapon may be applied only one time during the combat mode between a player and an enemy of the player in the online social game.

In one embodiment, a reward may be generated for the ally in response the selection of the ally by a player of the online social game. In another embodiment, the reward may be generated for the ally based on a result of the combat mode.

In one embodiment, the ally power up weapon may be randomly selected from a plurality of power up weapons from the ally of the online social game.

In one embodiment, the ally is an online neighbor of a player of the online social game or a friend of the player from a social networking system. The ally power up weapon may be based on a game level of the online neighbor or a specialty skill of the online neighbor.

In another embodiment, the ally may be a computer-generated player for hire for the combat mode for a predetermined amount of points.

Example Online Game Networking System

Figure 1:
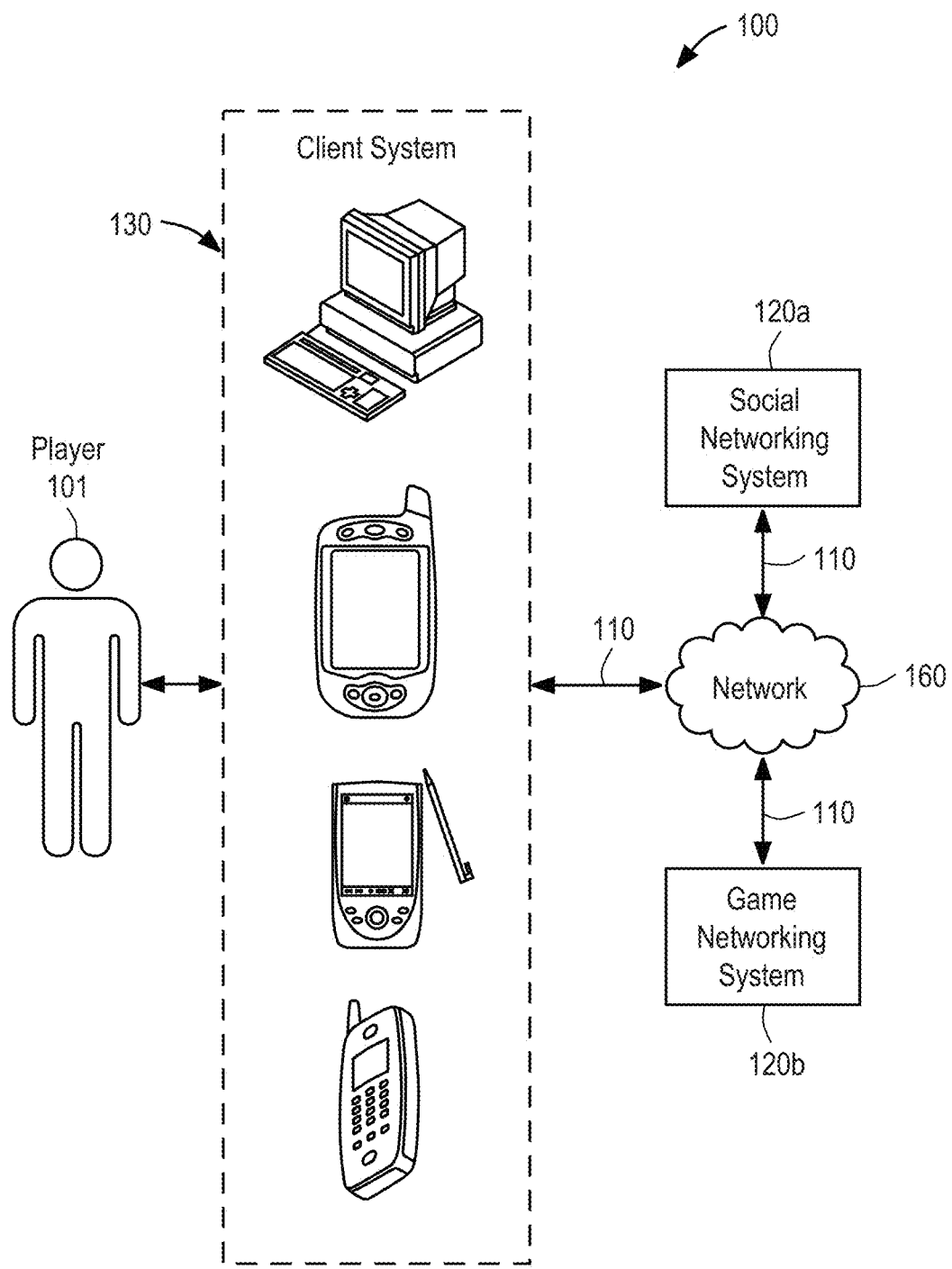
FIG. 1 is a block diagram illustrating an example of a system for implementing disclosed embodiments.

FIG. 1 illustrates an example of a system for implementing various disclosed embodiments. In particular embodiments, system 100 comprises player 101, social networking system 120*a*, game networking system 120*b*, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120*a* is a network-addressable computing system that can host one or more social graphs.

Social networking system 120*a* can generate, store, receive, and transmit social networking data. Social networking system 120*a* can be accessed by the other components of system 100 either directly or via network 160. Game networking system 120*b* is a network-addressable computing system that can host one or more online games. Game networking system 120*b* can generate, store, receive, and transmit game-related data, such as, for example, game account data, game input, game state data, and game displays. Game networking system 120*b* can be accessed by the other components of system 100 either directly or via network 160. Player 101 may use client system 130 to access, send data to, and receive data from social networking system 120*a* and game networking system 120*b*. Client system 130 can access social networking system 120*a* or game networking system 120*b* directly, via network 160, or via a third-party system. As an example and not by way of limitation, client system 130 may access game networking system 120*b* via social networking system 120*a*. Client system 130 can be any suitable computing device, such as a personal computer, laptop, cellular phone, smart phone, computing tablet, and the like.

Although FIG. 1 illustrates a particular number of players 101, social networking systems 120*a*, game networking systems 120*b*, client systems 130, and networks 160, this disclosure contemplates any suitable number of players 101, social networking systems 120*a*, game networking systems 120*b*, client systems 130, and networks 160. As an example and not by way of limitation, system 100 may include one or more game networking systems 120*b* and no social networking systems 120*a*. As another example and not by way of limitation, system 100 may include a system that comprises both social networking system 120*a* and game networking system 120*b*. Moreover, although FIG. 1 illustrates a particular arrangement of player 101, social networking system 120*a*, game networking system 120*b*, client system 130, and network 160, this disclosure contemplates any suitable arrangement of player 101, social networking system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120*a*, game networking system 120*b*, client system 130, and network 160, this disclosure contemplates any suitable connections between player 101, social networking system 120*a*, game networking system 120*b*, client system 130, and network 160. As an example and not by way of limitation, in particular embodiments, client system 130 may have a direct connection to social networking system 120*a* or game networking system 120*b*, bypassing network 160.

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b*, which can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130 and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs), while a game engine controls non-player characters (NPCs) and game features and also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and the like. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with a Blackacre territory in an online territory battling game. The first player may be able to build housing and weapons on Blackacre territory. If the first player accesses game instance associated with another player, such as Whiteacre territory, the game engine may not allow the first player to build housing or weapons in that game instance. However, other in-game actions may be available to the first player, such as viewing defending units on Whiteacre territory.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N-1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120*a* or game networking system 120*b*). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

FIG. 2A shows an example of a social network within a social graph. As shown, Player 206 can be associated, connected or linked to various other users, or "friends," within the social network 200. These associations, connections or links can track relationships between users within the social network 200 and are commonly referred to as online "friends" or "friendships" between users. Each friend or friendship in a particular user's social network within a social graph is commonly referred to as a "node." For purposes of illustration and not by way of limitation, the details of social network 200 will be described in relation to Player 206. As used herein, the terms "player" and "user" can be used interchangeably and can refer to any user or character in an online multiuser game system or social networking system. As used herein, the term "friend" can mean any node within a player's social network.

Figure 2:
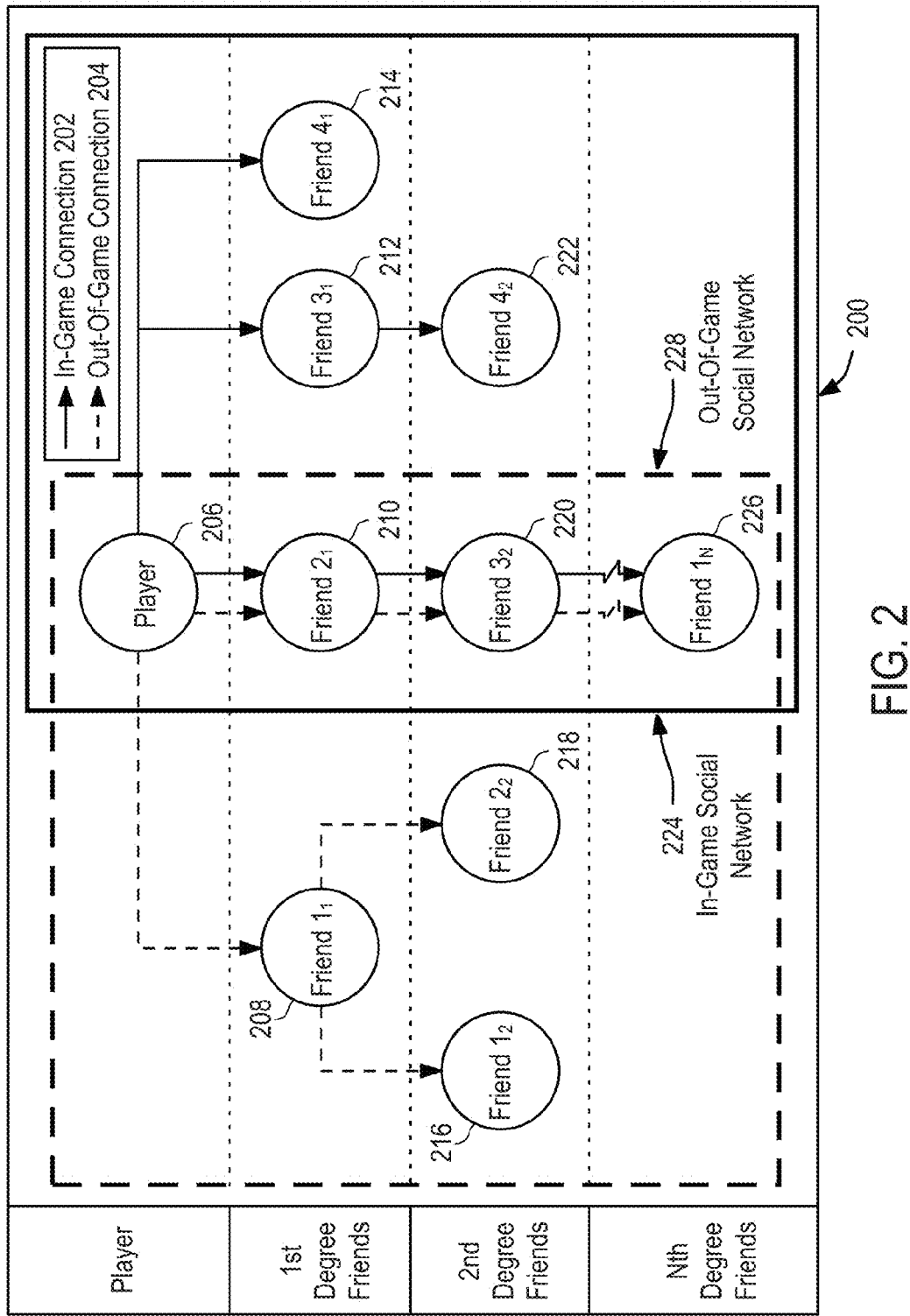
FIG. 2 is a block diagram illustrating an example social network.

As shown in FIG. 2, Player 206 has direct connections with several friends. When Player 206 has a direct connection with another individual that connection is referred to as a first-degree friend. In social network 200, Player 206 has two first-degree friends. That is, Player 206 is directly connected to Friend 208 and Friend 210. In a social graph, it is possible for individuals to be connected to other individuals through their first-degree friends (i.e., friends of friends). As described above, each edge required to connect a player to another user is considered the degree of separation. For example, FIG. 2 shows that Player 206 has three second-degree friends to which he is connected via his connection to his first-degree friends. Second-degree Friend 216 and Friend 218 are connected to Player 206 via his first-degree Friend 208. The limit on the depth of friend connections, or the number of degrees of separation for associations, that Player 206 is allowed is typically dictated by the restrictions and policies implemented by social networking system 120a.

In various embodiments, Player 206 can have Nth-degree friends connected to him through a chain of intermediary degree friends as indicated in FIG. 2. For example, Nth-degree Friend 1N 226 is connected to Player 206 via second-degree Friend 220 and one or more other higher-degree friends. Various embodiments may take advantage of and utilize the distinction between the various degrees of friendship relative to Player 206.

In particular embodiments, a player (or player character) can have a social graph within an online multiplayer game that is maintained by the game engine and another social graph maintained by a separate social networking system. FIG. 2 depicts an example of in-game social network 224 and out-of-game social network 228. In this example, Player 206 has out-of-game connections 204 to a plurality of friends, forming out-of-game social network 228. Here, Friend 208 and Friend 210 are first-degree friends with Player 206 in his out-of-game social network 228. Player 206 also has in-game connections 202 to a plurality of players, forming in-game social network 224. Here, Friend 212 and Friend 214 are first-degree friends with Player 206 in his in-game social network 224. Friend 222 is a second-degree friend with Player 206 in his in-game social network 224. In some embodiments, it is possible for a friend to be in both the out-of-game social network 228 and the in-game social network 224. Here, Friend 210 has both an out-of-game connection 204 and an in-game connection 202 with Player 206, such that Friend 210 is in both Player 206's in-game social network 224 and Player 206's out-of-game social network 228.

As with other social networks, Player 206 can have second-degree and higher-degree friends in both his in-game and out of game social networks. In some embodiments, it is possible for Player 206 to have a friend connected to him both in his in-game and out-of-game social networks, wherein the friend is at different degrees of separation in each network. For example, if Friend 218 had a direct in-game connection with Player 206, Friend 218 would be a second-degree friend in Player 206's out-of-game social network, but a first-degree friend in Player 206's in-game social network. In particular embodiments, a game engine can access in-game social network 224, out-of-game social network 228, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
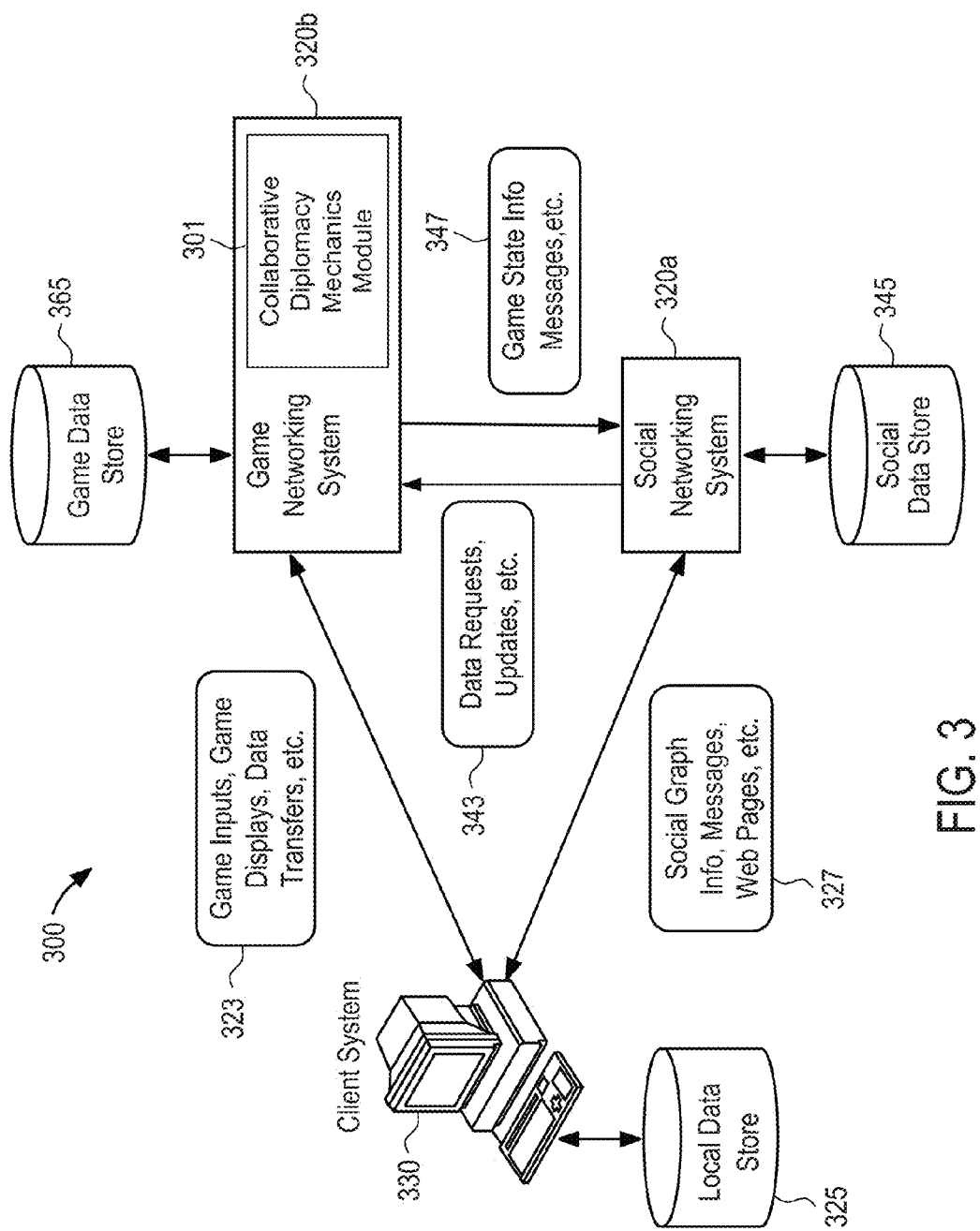
FIG. 3 is a block diagram illustrating an example data flow in a system.

FIG. 3 illustrates an example data flow between the components of a system 300. In particular embodiments, the system 300 can include a client system 330, a social networking system 320a, and a game networking system 320b. The components of the system 300 can be connected to each other in any suitable configuration, using any suitable type of connection. The components may be connected directly or over any suitable network. The client system 330, the social networking system 320a, and the game networking system 320b can each have one or more corresponding data stores such as local data store 325, social data store 345, and game data store 365, respectively. The social networking system 320a and the game networking system 320b can also have one or more servers that can communicate with the client system 330 over an appropriate network. The social networking system 320a and the game networking system 320b can have, for example, one or more internet servers for communicating with the client system 330 via the Internet. Similarly, the social networking system 320a and the game networking system 320b can have one or more mobile servers for communicating with the client system 330 via a mobile network (e.g., GSM, PCS, Wi-Fi, WPAN, etc.). In some embodiments, one server may be able to communicate with the client system 330 over both the Internet and a mobile network. In other embodiments, separate servers can be used.

The client system 330 can receive and transmit data 323 to and from the game networking system 320b. This data can include, for example, webpages, messages, game inputs, game displays, HTTP packets, data requests, transaction information, updates, and other suitable data. At some other time, or at the same time, the game networking system 320b can communicate data 347 (e.g., game state information, game system account information, page info, messages, data requests, updates, etc.) with other networking systems, such as the social networking system 320a (e.g., Facebook, Myspace, etc.). The client system 330 can also receive and transmit data 327 to and from the social networking system 320a. This data can include, for example, webpages, messages, social graph information, social network displays, HTTP packets, data requests, transaction information, updates, and other suitable data.

Communication between the client system 330, the social networking system 320a, and the game networking system 320b can occur over any appropriate electronic communication medium or network using any suitable communications protocols. For example, the client system 330, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols (such as HTTP), other communications protocols (such as HTTP-S, FTP, SNMP, TELNET), and a number of other protocols. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on the game networking system 320b, the BLOB containing the game state for the instance corresponding to the player can be transmitted to the client system 330 for use by a client-side executed object to process. In particular embodiments, the client-side executable may be a FLASH-based game, which can de-serialize the game state data in the BLOB. As a player plays the game, the game logic implemented at the client system 330 maintains and modifies the various game state parameters locally. The client-side game logic may also batch game events, such as mouse clicks, and transmit these events to the game networking system 320b. The game networking system 320b may itself operate by retrieving a copy of the BLOB from a database or an intermediate memory cache (memcache) layer. The game networking system 320b can also de-serialize the BLOB to resolve the game state parameters and execute its own game logic based on the events in the batch file of events transmitted by the client to synchronize the game state on the server side. The game networking system 320b may then re-serialize the game state, now modified, into a BLOB and pass this to a memory cache layer for lazy updates to a persistent database.

With a client-server environment in which the online games may run, one server system, such as the game networking system 320b, may support multiple client systems 330. At any given time, there may be multiple players at multiple client systems 330 all playing the same online game. In practice, the number of players playing the same game at the same time may be very large. As the game progresses with each player, multiple players may provide different inputs to the online game at their respective client systems 330, and multiple client systems 330 may transmit multiple player inputs and/or game events to game networking system 320b for further processing. In addition, multiple client systems 330 may transmit other types of application data to game networking system 320b.

In particular embodiments, a computer-implemented game may be a text-based or turn-based game implemented as a series of web pages that are generated after a player selects one or more actions to perform. The web pages may be displayed in a browser client executed on the client system 330. As an example and not by way of limitation, a client application downloaded to the client system 330 may operate to serve a set of web pages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by the social networking system 320a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at the client system 330, either caused by an action of a game player or by the game logic itself, the client system 330 may need to inform the game networking system 320b of the update. For example, if the game is a combat game with combat units and weapons mechanic (such as Zynga's Empires and Allies), an event can correspond to a player clicking on a barrack to build combat units. In such an instance, the application event data may identify an event or action (e.g., building barracks) and an object in the game to which the event or action applies. For illustration purposes and not by way of limitation, the system 300 is discussed in reference to updating a multi-player online game hosted on a network-addressable system (such as, for example, the social networking system 320a or the game networking system 320b), where an instance of the online game is executed remotely on the client system 330, which then transmits application event data to the hosting system such that the remote game server synchronizes game state associated with the instance executed by the client system 330.

In a particular embodiment, one or more objects of a game may be represented as an Adobe Flash object. Flash may manipulate vector and raster graphics and support bidirectional streaming of audio and video. "Flash" may mean the authoring environment, the player, or the application files. In particular embodiments, the client system 330 may include a Flash client. The Flash client may be configured to receive and run Flash application or game object code from any suitable networking system (such as, for example, the social networking system 320a or the game networking system 320b). In particular embodiments, the Flash client may be run in a browser client executed on the client system 330. A player can interact with Flash objects using the client system 330 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at the client system 330, the Flash client may send the events that caused the game state changes to the in-game object to the game networking system 320b. However, to expedite the processing and hence the speed of the overall gaming experience, the Flash client may collect a batch of some number of events or updates into a batch file. The number of events or updates may be determined by the Flash client dynamically or determined by game networking system 320b based on server loads or other factors. For example, the client system 330 may send a batch file to the game networking system 320b whenever several updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at the client system 330. In particular embodiments, the batch file may be a text file and the name-value pairs may be in string format.

In particular embodiments, when a player plays an online game on the client system 330, the game networking system 320b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, the game networking system 320b may retrieve the corresponding BLOB from the database to determine the most recent values of the game-related data. In particular embodiments, while a player is playing the online game, the game networking system 320b may also load the corresponding BLOB into a memory cache so that the game system may have faster access to the BLOB and the game-related data contained therein.

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by the game networking system 320b, which can be accessed over any suitable network with an appropriate client system 330. A player may have a game system account on a game system of the game networking system 320b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on the game system 321 and merely accessed via the third-party website. The embedded online game can be hosted solely on a server of the game system 321 or using a third-party vendor server. In addition, any combination of the functions of the present disclosure can be hosted on or provided from any number of distributed network resources. For example, one or more executable code objects that implement all or a portion of the game can be downloaded to a client system for execution.

A collaborative diplomacy mechanics module 301 of the game networking system 320b communicates with the social networking system 320a. An API may be provided to interface both social networking system 320a and the game networking system 320b with the collaborative diplomacy mechanics module 301.

The collaborative diplomacy mechanics module 301 may be configured to receive from a player a request to engage in a combat mode against a computer-controlled player in the online social game. The collaborative diplomacy mechanics module 301 first determines whether the player is eligible to select an ally to assist the player in the combat game mode based on a game level of the player in the online social game. If the player is eligible, one or more allies are generated from which the player can select based on the game level of the player and/or the number of in game neighbors of the player. Allies can be in game neighbors, friends from a social networking system, or a computer-controlled player for hire. Allies provide a random power-up feature (for example, increase defensive and/or offensive power of the player in the battle) or a super weapon (for example, bombs, powerful artillery, air strikes, and so forth) per battle. The super weapon is generated based on a profile of the selected ally or randomly selected. The super weapon can be applied one-time during the combat game mode or the battle.

In one embodiment, after a friend or in game neighbor is used as an ally in a battle, that friend or in game neighbor will not be available for combat for another period of time (for example, 24 hours). However, the player can hire a mercenary (a computer-controlled player) for cash if no other friends or in game neighbors are available as allies.

Figure 4:
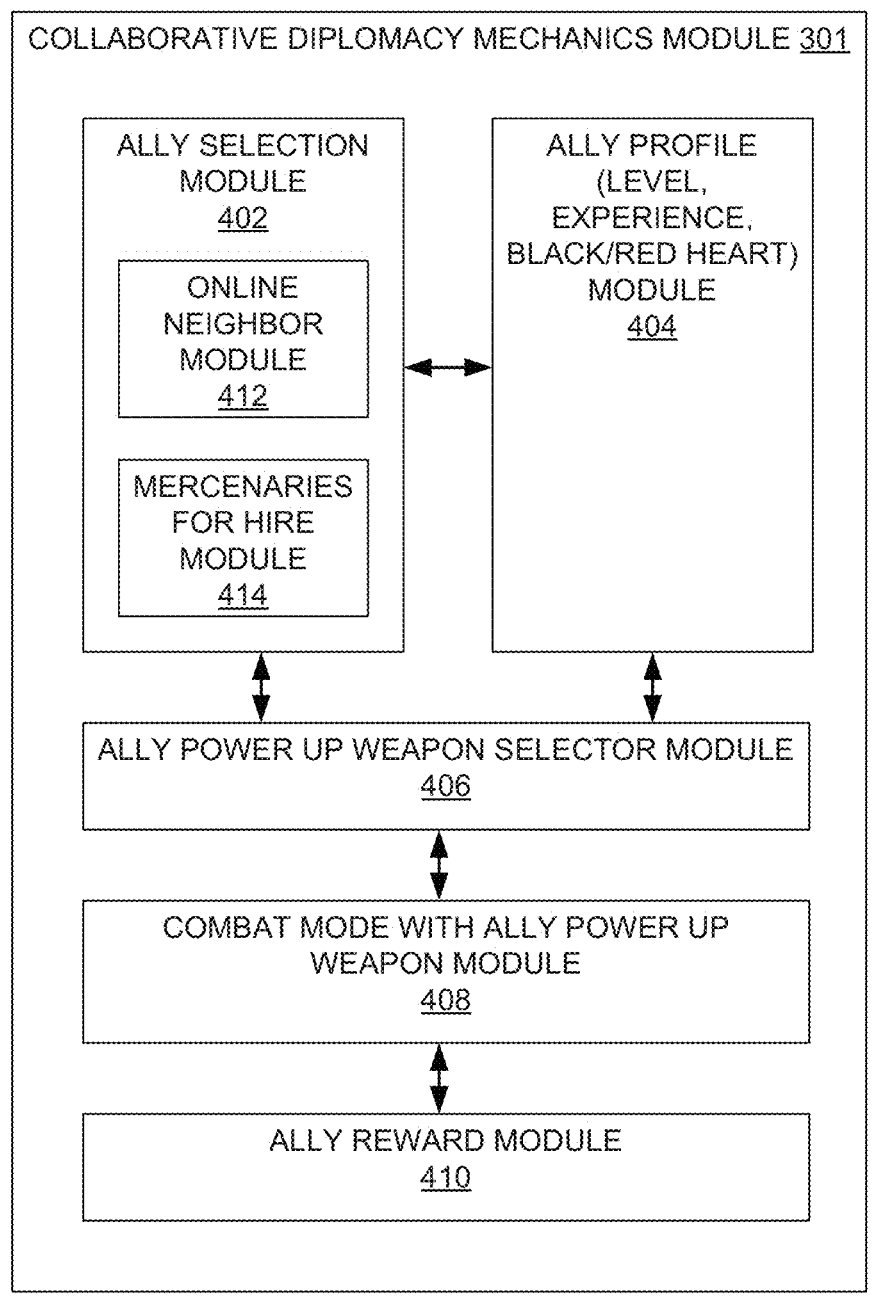
FIG. 4 is a block diagram illustrating one embodiment of a collaborative diplomacy mechanics module.

FIG. 4 illustrates one embodiment of the collaborative diplomacy mechanics module 301. The collaborative diplomacy mechanics module 301 includes an ally selection module 402, an ally profile module 404, an ally power up weapon selector module 406, a combat mode with ally power up weapon module 408, and an ally reward module 410.

The ally selection module 402 may determine whether the player is eligible to select an ally for a combat mode in an online social game. For example, the player may be playing a mission based mode of the online social game. The player may have reached a minimum level to be eligible to use an ally in the combat mode. As such, the ally selection module 402 may present the player with one or more allies for the player to choose from. The ally selection module 402 may include an online neighbor module 412 and a mercenaries for hire module 414.

The online neighbor module 412 may be configured to determine and generate in game neighbors of the player that may be eligible to participate as allies in the battle. Generally, an in game neighbor can only be used as an ally of the player in a battle for a predetermined amount of time, for example, 24 hours. In another embodiment, the online neighbor may determine neighbors or friends of the player in the online social game of the game networking system, friends of the player outside the online social game (in another online social game), friends of the player from the social networking system.

The mercenaries for hire module 414 may be configured to determine and generate computer controlled players or allies. For example, the player may hire an ally for a fee such as points, coins, etc . . .

After presenting the choice of allies to the player, the ally selection module 402 may also be configured to receive a selection of an ally to be engaged in the combat mode or battle mode of the online social game from the player.

The ally profile module 404 stores profiles of allies. For example, the ally profile may include the game level of the ally in the online social game, the experience level of the ally, the black/red heart level (black level increases as the player attacks other more often, red level increases as the player defends other players more often), the weapon specialty of the player, the number of types of combat units of the player, and so forth.

The ally power up weapon selector module 406 generates an ally power up weapon based on the profile of the selected ally. In one embodiment, the ally power up weapon may be randomly generated from the power up weapons available to the ally or earned by the ally. In another embodiment, the ally power up weapon may be selected based on the black or red heart level. For example, the ally power up weapon may include a speedy recovery power if the ally has a high red heart level. In yet another embodiment, the ally power up weapon may be selected based on a specialty of the ally. For example, if the ally has a lot of air combat units, the ally power up weapon may be related to air combat units powers.

The combat mode with ally power up weapon module 408 applies the ally power up weapon against combat units of an enemy of a player in the combat mode or on the combat units of the player in the combat mode. For example, the power up weapon may cause extra damages to the combat units of the enemy of the player in the battle. In another example, the power up weapon may cause additional defense abilities to the combat units of the player in the battle.

The ally reward module 410 may generate a reward for the ally in response to the selection of the ally by a player of the online social game. In another embodiment, the ally reward module 410 may generate the reward for the ally based on a result of the combat mode. For example, if the player wins the battle, the reward may be higher than if the player loses the battle. Rewards may include points, coins, power up weapons, experience points, and so forth.

Figure 5A:
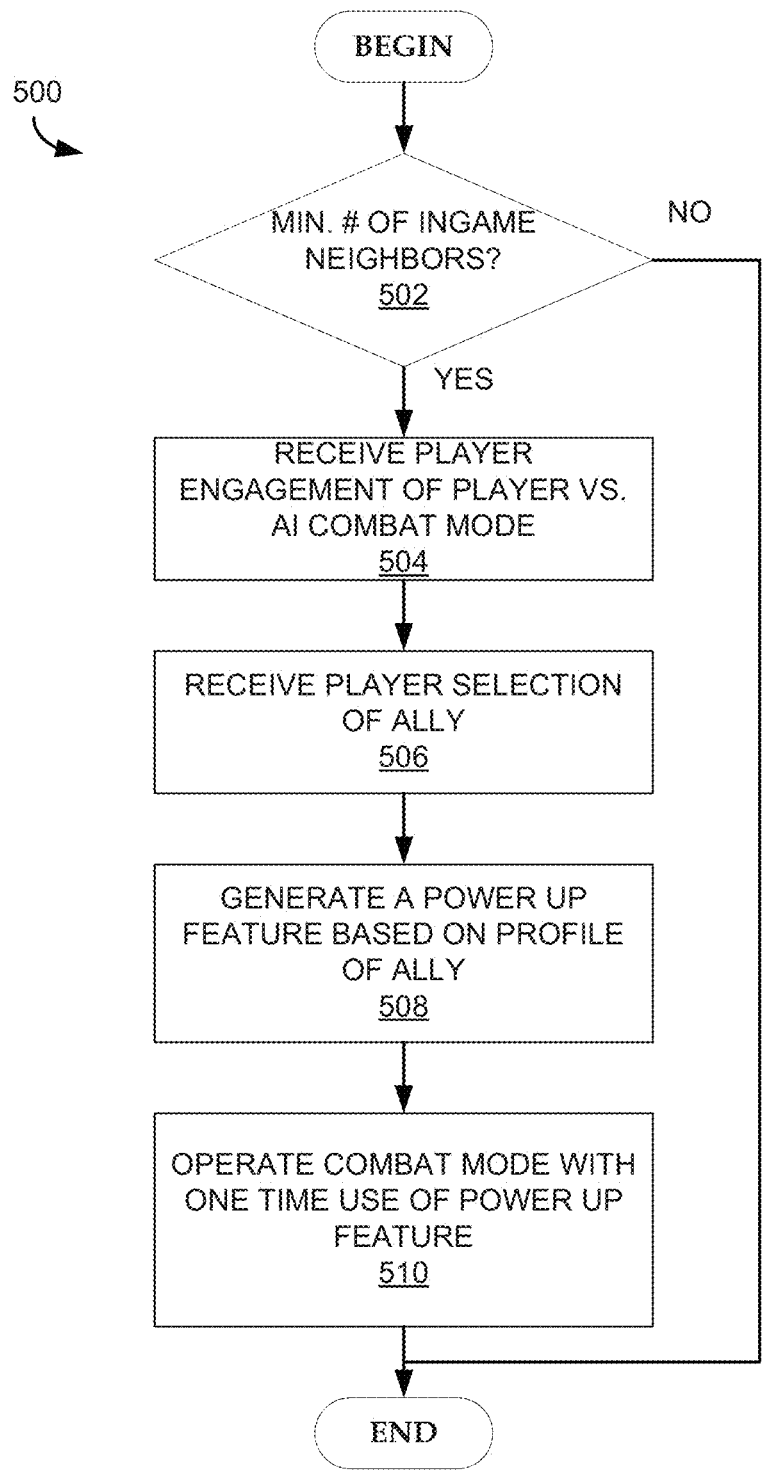
FIG. 5A is a flow diagram illustrating one example embodiment of a method for operating a combat mode with an ally.

FIG. 5A illustrates a flow diagram 500 of an example of a method for collaborative diplomacy mechanics for an online social game. At operation 502, in order to enter into a combat engagement, users need a minimum number of in-game neighbors, also known as allies, available to participate in that engagement. The user selects the allies for that fight, select their military unit, and enter into the combat engagement. In that engagement, allies act as a superweapon. The user can choose to deploy the superweapon during any of their combat turns, which casts a power up. The ally is then "consumed" and can't be used again within that combat engagement. Additionally, that ally is not available to help enter another combat engagement until a fixed amount of time (ie24 hrs) passes. Once that period of time is over, the user can then use that person as one of the allies required to enter the next combat engagement. If users do not have actual allies available, they may purchase a Hero, which functions the same as an ally. An alternate implementation will also be tested where an ally is not consumed until they are actually deployed in combat engagements. This feature may also be referred to as "friends as energy" mechanic.

At 502, a minimum number of in games neighbors is required before a player engaged into a combat mode against another player (AI). In another embodiment, a minimum number of in games neighbors is required before a player can utilize the help of an ally before engaging into a combat mode against another player (AI).

At 504, the player selects to engage in a combat mode against the AI player.

At 506, the player selects or can purchase an ally to help defeat the AI player.

At 508, a super weapon is selected based on the profile of the ally. For example, the super weapon is selected from an array of super weapons in possession by the ally. In another embodiment, the super weapon is randomly selected. In another embodiment, the selected super weapon is based on the level of the ally. In another embodiment, the super weapon is selected based on a profile of the ally. For example, if the ally has more red hearts (good deeds like helping others) than black hearts (black deeds like attacking others), the super weapon may be geared towards enhancing the healing power of the army units of the player (attacker). On the other hand, if the ally has more black hearts, the super weapon may be geared towards increasing the damage ability of a weapon.

At 510, in one embodiment, the super power weapon is cast only one time within a predefined amount of time (e.g. within the combat mode or within 24 hours of the attack).

One of the concepts as previously discussed is to combine the harvest mechanic and other features previously unique to action space social games like Farmville and Café World with the battle mechanics of the adapted spreadsheet games like Mafia Wars. Already designed into Empires & Allies are features such as growing and harvesting food needed for armies and natural resources such as metals, wood and energy needed to build factories, ammunition stockpiles and weapons. One game feature is that a player may use his or her friends as "consumable power-ups" in battle. One feature include factoring battle strength and a player's capabilities/prospects of prevailing in battle based on the unique game profiles of those friends which that player chooses to bring into battle. For example, a friend's game level, preferred battle mode (air, land, sea) and unique accomplishments in building his or her own empire would be factored into a player's battle team strength and capabilities. Similarly the player against whom the first was going into battle would also have these attributes factored into his or her position and prospects.

Figure 5B:
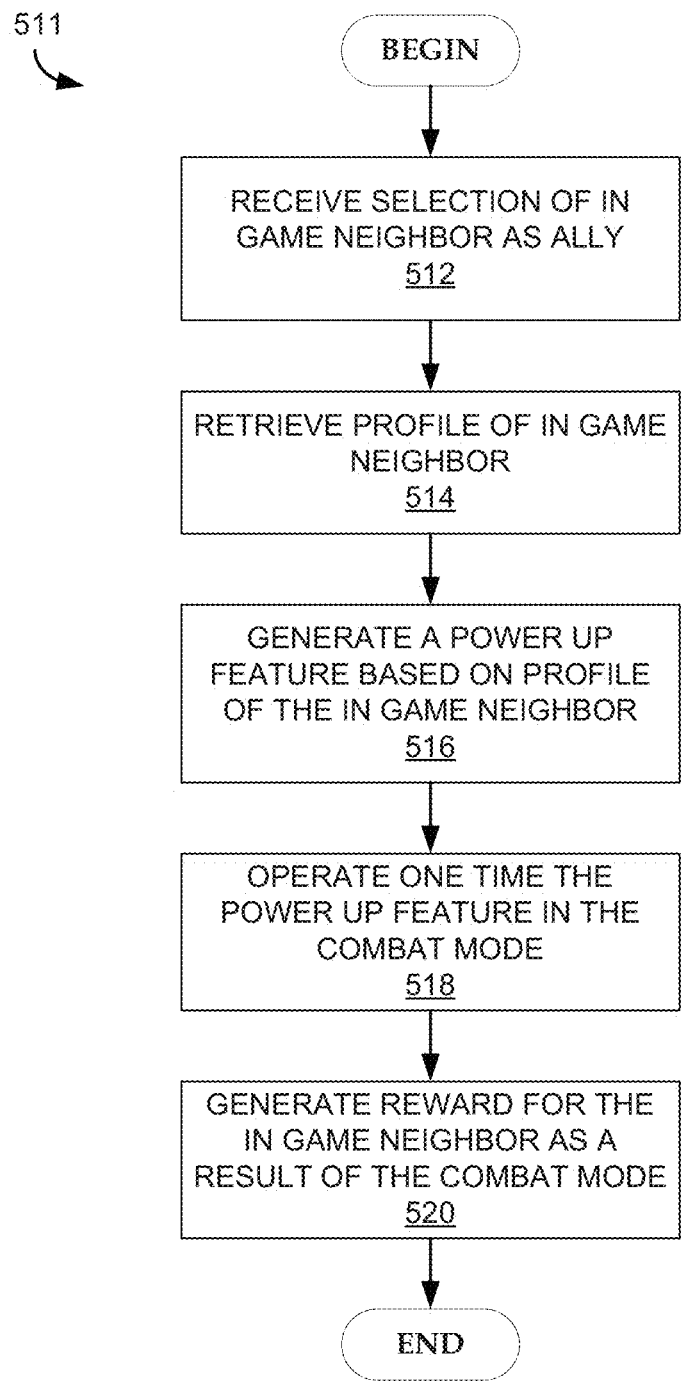
FIG. 5B is a flow diagram illustrating one example embodiment of a method for operating a combat mode with an online neighbor as an ally.

FIG. 5B is a flow diagram 511 illustrating one example embodiment of a method for operating a combat mode with an online neighbor (also referred to as in game neighbor) as an ally. At 512, the player selects an in game neighbor as an ally for a battle against a computer-controlled player in the online social game. At 514, the profile of the in game neighbor is retrieved. At 516, the power up feature is based on the profile of the in game neighbor. At 518, the power up feature in the combat mode is operated one time during the battle. At 520, a reward may be generated for the in game neighbor for helping the player.

Figure 5C:
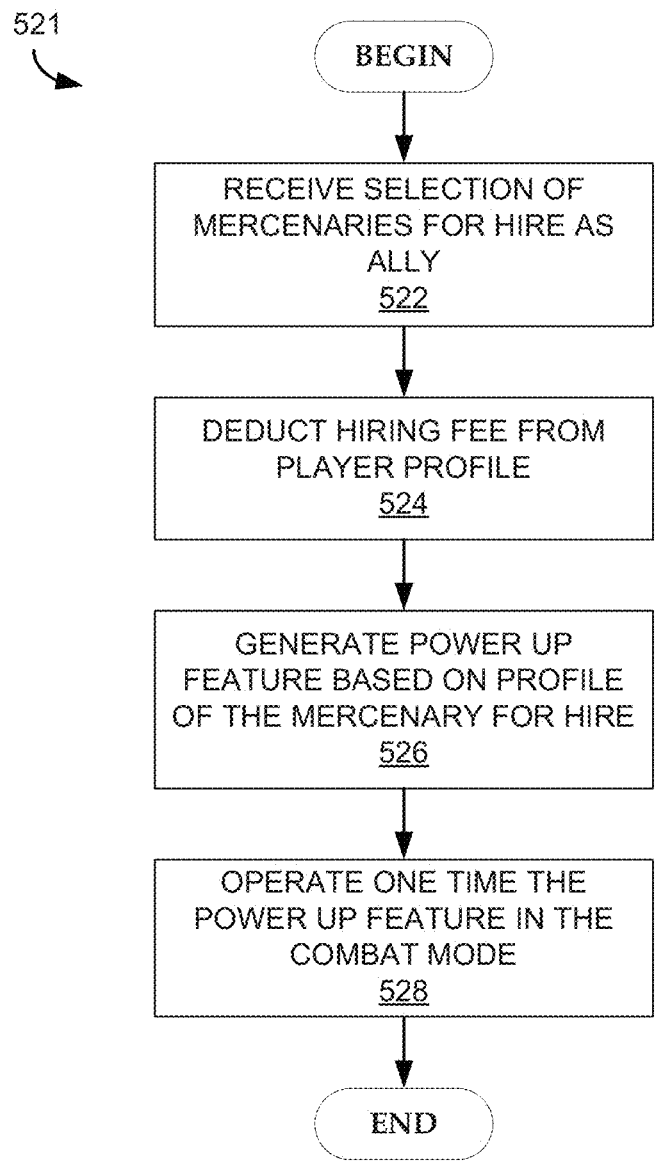
FIG. 5C is a flow diagram illustrating one example embodiment of a method for operating a combat mode with a mercenary for hire as an ally.

FIG. 5C is a flow diagram 521 illustrating one example embodiment of a method for operating a combat mode with a mercenary for hire as an ally. At 522, a player selects a mercenary for hire (for example, a computer-controlled player) as an ally for a battle against a computer-controlled player in the online social game. At 524, the fee for using the ally is deducted from the player. For example, 50 coins may be deducted from the player for using a particular ally. At 526, the power up feature may be generated based on the profile of mercenary ally. For example, the mercenary may have a specialty with naval weapons. As such, the power up weapon may be related to naval weapons. At 528, the power up feature in the combat mode is operated one time during the battle.

Figure 6:
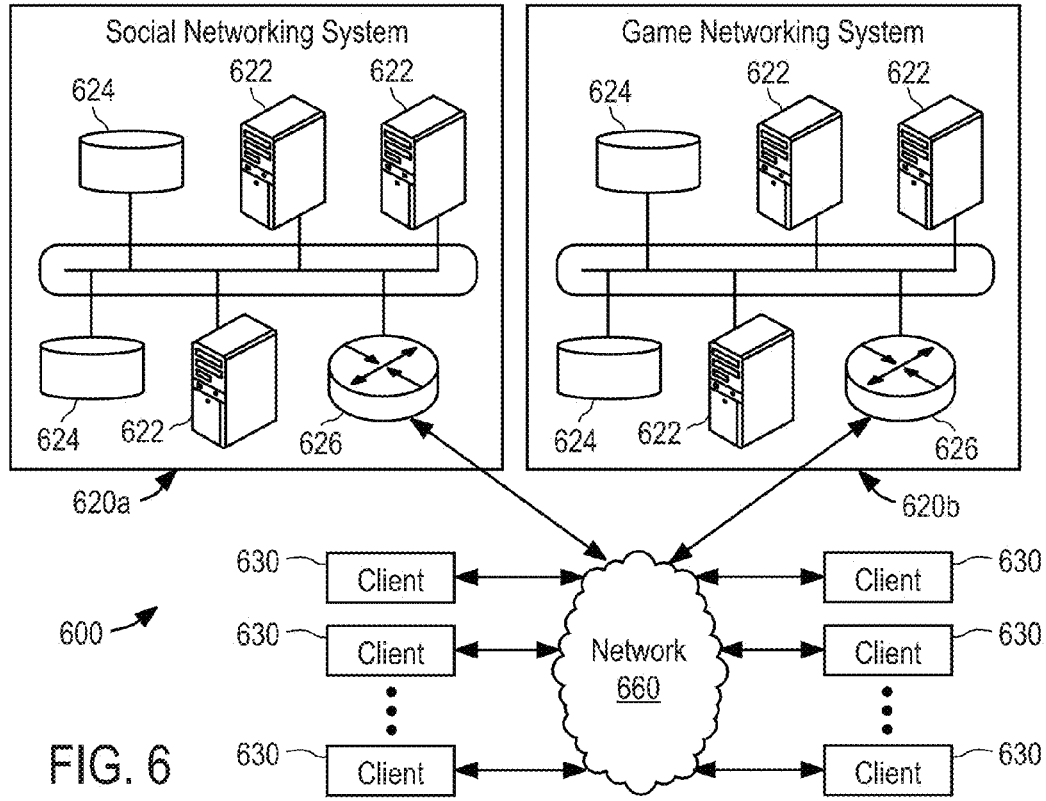
FIG. 6 is a block diagram illustrating an example network environment.

FIG. 6 illustrates an example network environment in which various example embodiments may operate. In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 6 illustrates, particular embodiments may operate in a network environment comprising one or more networking systems, such as social networking system 620a, game networking system 620b, and one or more client systems 630. The components of social networking system 620a and game networking system 620b operate analogously; as such, hereinafter may be referred to simply at networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to network cloud 660 via, by way of example, a set of routers and/or networking switches 626. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 622 may host functionality directed to the operations of networking system 620. Hereinafter, servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client system 630. The request may also include location information identifying a geographic location of the user's client system 630 or a logical network location of the user's client system 630. The request may also include a timestamp identifying when the request was transmitted.

Although the example network environment described above and illustrated in FIG. 6 is described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

Figure 7:
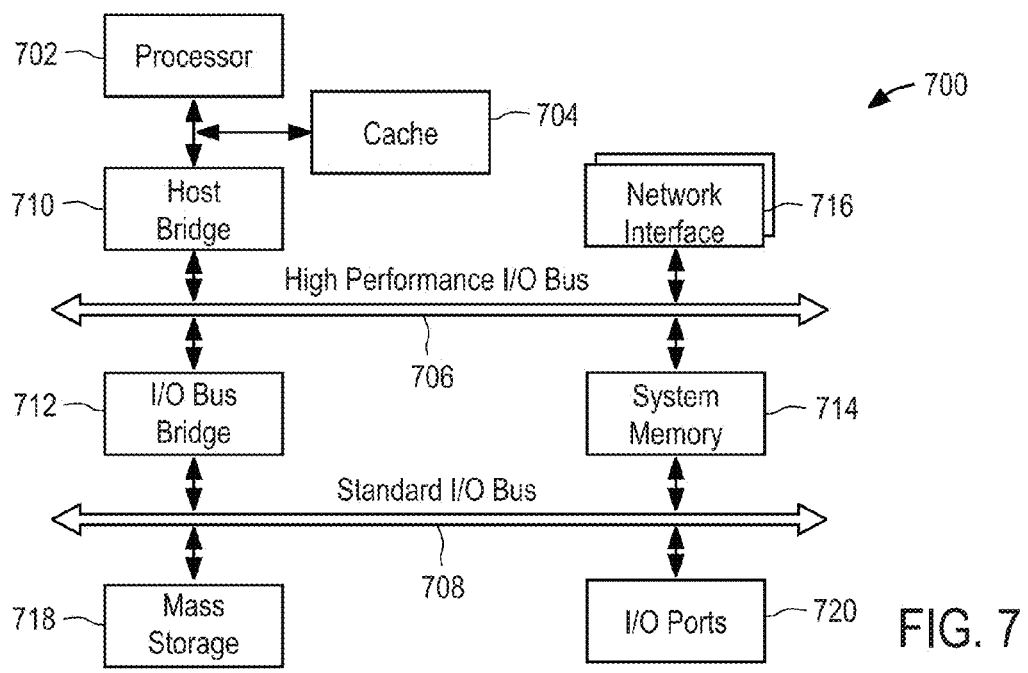
FIG. 7 is a block diagram illustrating an example of a computer system architecture.

FIG. 7 illustrates an example computing system architecture, which may be used to implement a server 622 or a client system 630. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, California, and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, and the like. Mass storage 718 provides permanent storage for the data and programming instructions to perform the above-described functions implemented in servers 622, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures, and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Empires and Allies Example

Figure 8A:
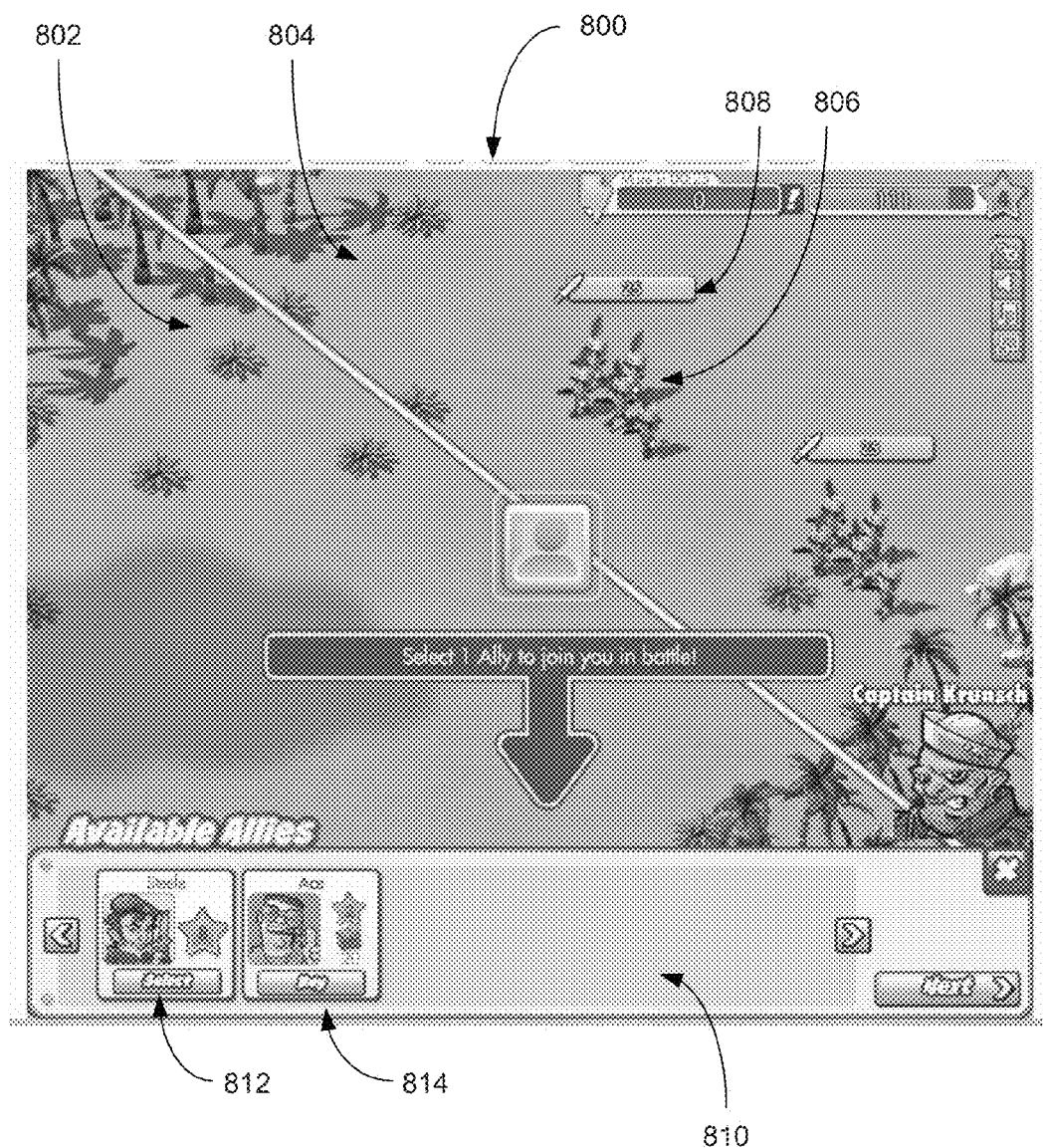
FIG. 8A is a block diagram illustrating an example screenshot of a selection of an ally for a combat mode.

An example of collaborative diplomacy mechanics is illustrated in FIGS. 8A, 8B, 8C, and 8D. FIG. 8A illustrates a combat mode screenshot 800. The lower map portion 802 represents combat units from the player. The upper map portion 804 represents combat units 806 from the enemy. The combat units 806 may be identified with their corresponding fighting strength level 808. An ally toolbar 810 on the bottom of the combat mode screenshot 800 displays available allies. In that example, the ally toolbar 810 displays two available allies: an in game neighbor 812, and a mercenary for hire 814. The player is asked to select an ally to join the battle.

Figure 8B:
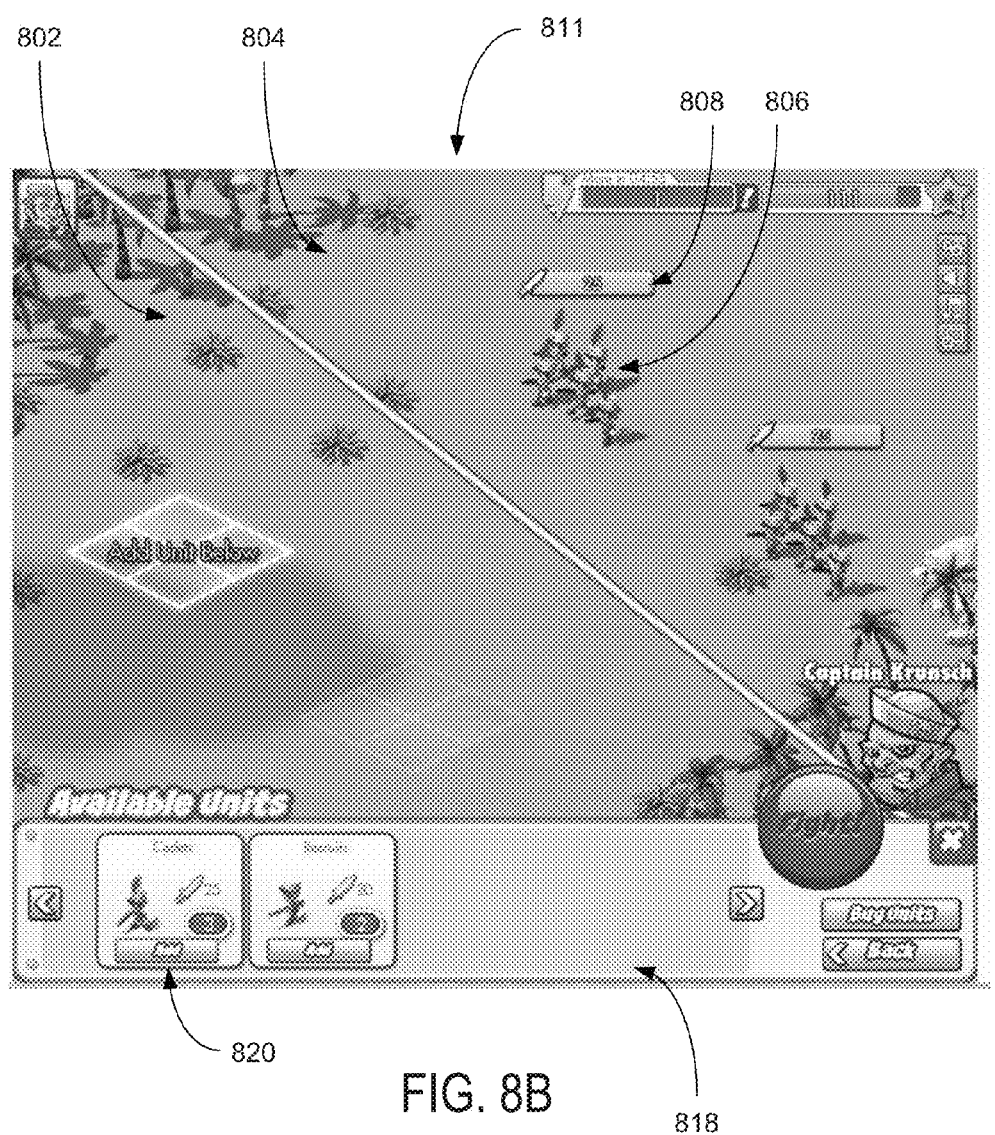
FIG. 8B is a block diagram illustrating an example screenshot of a selection of available combat units for a combat mode.

FIG. 8B illustrates a combat mode screenshot 811. The player is asked to select available combat units 820 from the available units toolbar 818 to be placed on the battle ground.

Figure 8C:
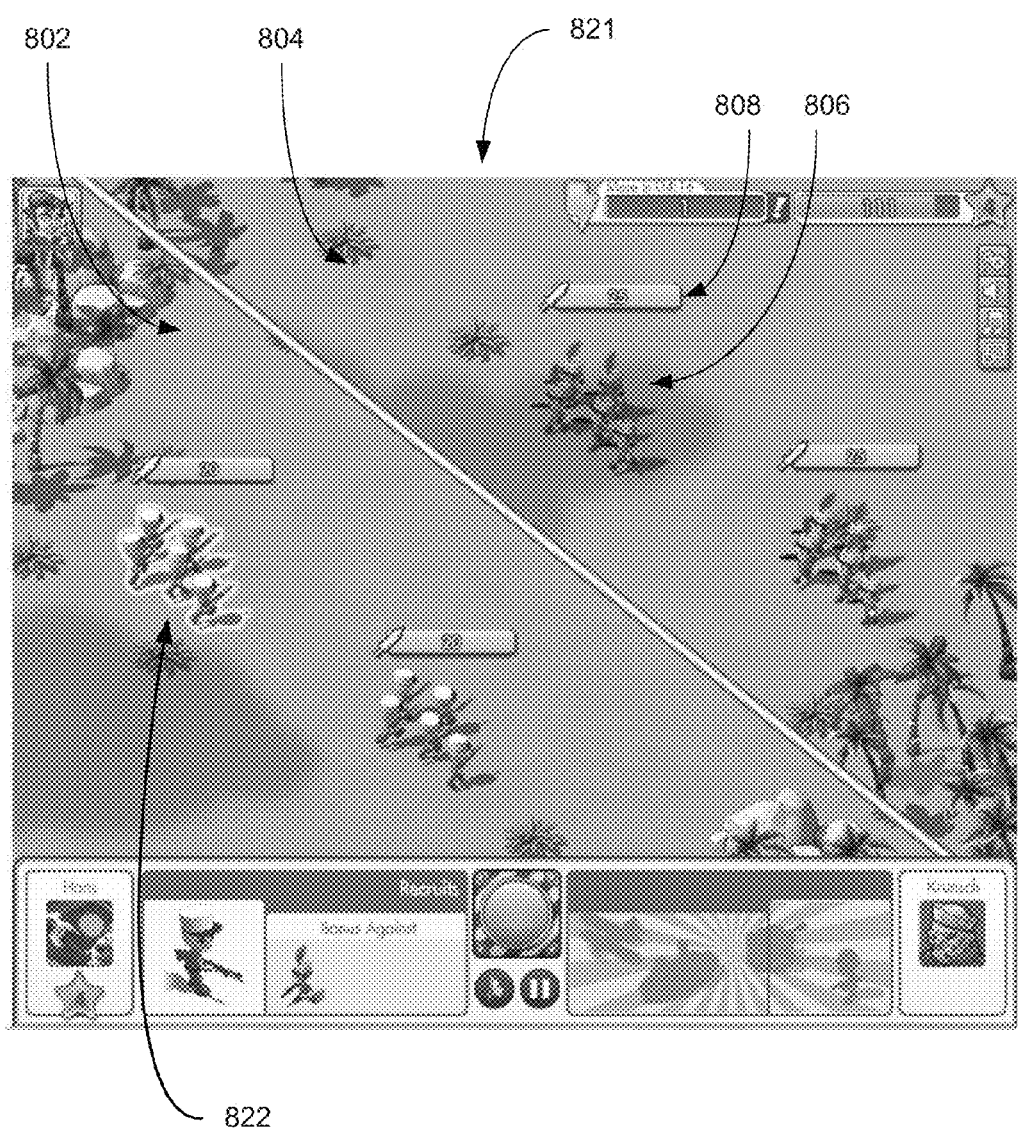
FIG. 8C is a block diagram illustrating an example screenshot of combat units in a combat mode.

FIG. 8C illustrates a combat mode screenshot 821. The selected combat unit 822 goes into combat with combat unit 806 from the enemy.

Figure 8D:
FIG. 8D is a block diagram illustrating an example screenshot of the user of a power up weapon from an ally in a combat mode.

FIG. 8D illustrates a combat mode screenshot 831. The selected ally 824 casts a special power up weapon 826 on the combat units of the enemy.

Miscellaneous

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with business-related virtual objects (such as stores and restaurants), the disclosure can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    an ally selection module comprising one or more computer processors configured to:
        access a social network graph of which a player of a computer-implemented multiplayer online game forms part, the social network graph comprising a plurality of other players that are candidate allies for the player, and
        enable the player to select, from the plurality of candidate allies, an ally to assist the player in a competitive engagement during gameplay;
        in an automated operation performed by the ally selection module, select a specialty effect for the selected ally from a plurality of different candidate specialty effects, selection of the specialty effect being based on one of:
            a game profile of the selected ally, and
            random selection by the ally selection module from a set of specialty effects available to or earned by the selected ally; and
    a game engine comprising at least one computer processor configured to make the specialty effect of the selected ally available to the player for only a single deployment during any one competitive engagement by performing operations comprising:
        generating a game user interface for a particular competitive engagement;
        receiving user input via the game user interface selecting deployment of the specialty effect of the selected ally;
        responsive to the user input, deploying the specialty effect of the selected ally in the competitive engagement; and
        thereafter, for the duration of the competitive engagement, making the specialty effect of the selected ally unavailable for deployment via the game user interface.

2. The system of claim 1, wherein the competitive engagement comprises a combat event in which the player combats one or more opponents.

3. The system of claim 2, wherein the specialty effect of the selected ally comprises a special power-up weapon that has an enhanced combat capability relative to regular combat abilities.

4. The system of claim 3, wherein deployment of the specialty effect of the selected ally comprises applying the special power-up weapon against at least combat unit of the one or more opponents.

5. The system of claim 1, wherein, for each of the plurality of candidate allies, the respective specialty effect has attributes determined based at least in part on a game level attained by the corresponding candidate ally in the game.

6. The system of claim 1, wherein, for each of the plurality of candidate allies, the respective specialty effect has attributes determined based at least in part on a particular specialty skill of the corresponding candidate ally, the particular specialty skill being one of a plurality of alternative specialty skills, each ally being allowed only one of the plurality of specialty skills.

7. The system of claim 1, wherein the plurality of candidate allies is a plurality of respective players of the game, each candidate ally being a member of a social network of the player.

8. The system of claim 7, wherein the game engine is configured to pit the player against a computer-controlled opposition during the competitive engagement.

9. The system of claim 1, further comprising an ally reward module configured to generate a reward to the ally in response to selection of the ally by the player.

10. The system of claim 9, wherein the ally reward module is configured to generate the reward based at least in part on an outcome of the competitive engagement.

11. A method comprising:
    accessing a social network graph of which a player of a computer-implemented multiplayer online game forms part, the social network graph comprising a plurality of other players that are candidate allies for the player;
    generating a graphical user interface configured for enabling the player to select, from a plurality of candidate allies, an ally to assist the player in a competitive engagement during gameplay;
    in an automated operation performed by an ally selection module comprising one or more computer processors configured to perform the automated operation, selecting a specialty effect for the selected ally from a plurality of different candidate specialty effects, selection of the specialty effect being based on at least one of:
        a game profile of the selected ally, and
        random selection by the ally selection module from a set of specialty effects available to or earned by the selected ally; and
    making the specialty effect of the selected ally available to the player for only a single deployment during any one competitive engagement by performing operations comprising:
        generating a game user interface for a particular competitive engagement;
        receiving user input via the game user interface selecting deployment of the specialty effect of the selected ally;
        responsive to the user input, deploying the specialty effect of the selected ally in the competitive engagement; and thereafter, for the duration of the competitive engagement, making the specialty effect of the selected ally unavailable for deployment via the game user interface.

12. The method of claim 11, wherein the competitive engagement comprises a combat event in which the player combats one or more opponents.

13. The method of claim 12, wherein the specialty effect of the selected ally comprises a special power-up weapon that has an enhanced combat capability relative to regular combat abilities.

14. The method of claim 13 wherein deployment of the specialty effect of the selected ally comprises applying the special power-up weapon against at least combat unit of the one or more opponents.

15. The method of claim 11, further comprising, for each of the plurality of candidate allies, determining attributes of the respective specialty effect based at least in part on a game level attained by the corresponding candidate ally in the game.

16. The method of claim 11, further comprising, for each of the plurality of candidate allies, determining attributes of the respective specialty effect based at least in part on a particular specialty skill of the corresponding candidate ally, the particular specialty skill being one of a plurality of alternative specialty skills, each ally being allowed only one of the plurality of specialty skills.

17. The method of claim 11, wherein the plurality of candidate allies is a plurality of respective players of the game, each candidate ally being a member of a social network of the player.

18. The method of claim 11, further comprising providing a reward to the ally in response to selection of the ally by the player.

19. The method of claim 18, wherein the ally reward module is configured to generate the reward based at least in part on an outcome of the competitive engagement.

20. A non-transitory computer readable storage medium having stored thereon instructions for causing a machine, responsive to execution of the instructions by the machine, to perform operations comprising:
  accessing a social network graph of which a player of a computer-implemented multiplayer online game forms part, the social network graph comprising a plurality of other players that are candidate allies for the player;
  generating a graphical user interface configured for enabling the player to select, from a plurality of candidate allies, an ally to assist the player in a competitive engagement during gameplay,
  in an automated operation, selecting a specialty effect for the selected ally from a plurality of different candidate specialty effects, selection of the specialty effect being based on at least one of:
    a game profile of the selected ally, and
    random selection by the machine from a set of specialty effects available to or earned by the selected ally; and
  making the specialty effect of the selected ally available to the player for only a single deployment during any one competitive engagement by performing operations comprising:
    generating a game user interface for a particular competitive engagement:
    receiving user input via the game user interface selecting deployment of the specialty effect of the selected ally;
    responsive to the user input, deploying the specialty effect of the selected ally in the competitive engagement; and
    thereafter, for the duration of the competitive engagement, making the specialty effect of the selected ally unavailable for deployment via the game user interface.

* * * * *

UNITED STATES PATENT AND TRADEMARK OFFICE
CERTIFICATE OF CORRECTION

PATENT NO. : 9,937,424 B2  
APPLICATION NO. : 14/337681  
DATED : April 10, 2018  
INVENTOR(S) : Ajami et al.

Page 1 of 1

It is certified that error appears in the above-identified patent and that said Letters Patent is hereby corrected as shown below:

On the Title Page

In Column 2, item (56), under "Other Publications", Line 1, delete ""Knightood" and insert --"Knighthood-- therefor In the Specification In Column 13, Line 52, delete "etc . . ." and insert --etc.-- therefor In Column 14, Line 39, delete "(ie24 hrs)" and insert --(i.e., 24 hrs)-- therefor In Column 16, Line 19, delete "122" and insert --622-- therefor In the Claims In Column 24, Line 12, in Claim 20, delete "gameplay," and insert --gameplay;-- therefor In Column 24, Line 25, in Claim 20, delete "engagement:" and insert --engagement;-- therefor Signed and Sealed this  
Eighth Day of December, 2020

Andrei Iancu  
*Director of the United States Patent and Trademark Office*